United States Patent
Tsuruoka et al.

(10) Patent No.: US 12,493,438 B2
(45) Date of Patent: Dec. 9, 2025

(54) OUTPUT CONTROL SYSTEM, OUTPUT CONTROL METHOD, AND RECORDING MEDIUM

(71) Applicant: NEC Corporation, Tokyo (JP)

(72) Inventors: Yuki Tsuruoka, Tokyo (JP); Akihiko Onita, Tokyo (JP); Yushi Niwa, Tokyo (JP); Takashi Miyake, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/725,217

(22) PCT Filed: Jan. 18, 2022

(86) PCT No.: PCT/JP2022/001549
§ 371 (c)(1),
(2) Date: Jun. 28, 2024

(87) PCT Pub. No.: WO2023/139630
PCT Pub. Date: Jul. 27, 2023

(65) Prior Publication Data
US 2025/0060926 A1  Feb. 20, 2025

(51) Int. Cl.
*G02B 27/01* (2006.01)
*G06F 3/01* (2006.01)
*G06F 3/14* (2006.01)

(52) U.S. Cl.
CPC .......... *G06F 3/1423* (2013.01); *G06F 3/011* (2013.01)

(58) Field of Classification Search
CPC ........... G06F 3/1423; G06F 3/01; G06F 3/011
See application file for complete search history.

(56) References Cited

U.S. PATENT DOCUMENTS

| | | | |
|---|---|---|---|
| 12,125,154 B1* | 10/2024 | Carrasco | G06F 40/169 |
| 2014/0157114 A1* | 6/2014 | Halme | G06Q 10/10 715/249 |
| 2014/0247278 A1* | 9/2014 | Samara | G06T 11/00 345/633 |
| 2016/0196694 A1* | 7/2016 | Lindeman | G06F 3/011 345/633 |
| 2017/0344124 A1 | 11/2017 | Douxchamps et al. | |
| 2021/0103792 A1* | 4/2021 | Schimmel | G06K 19/0717 |
| 2021/0382605 A1* | 12/2021 | Edwards | G06F 3/04815 |
| 2022/0408136 A1* | 12/2022 | Wang | H04N 21/439 |

FOREIGN PATENT DOCUMENTS

| | | |
|---|---|---|
| JP | 2016-162351 A | 9/2016 |
| JP | 2019-040492 A | 3/2019 |
| JP | 2019-046458 A | 3/2019 |
| JP | 2019-053603 A | 4/2019 |
| WO | 2019/102825 A1 | 5/2019 |

OTHER PUBLICATIONS

International Search Report for PCT Application No. PCT/JP2022/001549, mailed on Apr. 12, 2022.
English translation of Written opinion for PCT Application No. PCT/JP2022/001549, mailed on Apr. 12, 2022.

\* cited by examiner

*Primary Examiner* — Sanghyuk Park
(74) *Attorney, Agent, or Firm* — Sughrue Mion, PLLC

(57) ABSTRACT

This output control system comprises: a specifying unit; and a first output control unit. The specifying unit specifies the position of a tablet by recognizing the code displayed on a tablet in a real space by using an imaging device. The first output control unit displays a shape representing an input area of the tablet of which the position is specified in a virtual space on the head-mounted display.

18 Claims, 15 Drawing Sheets

Fig.12
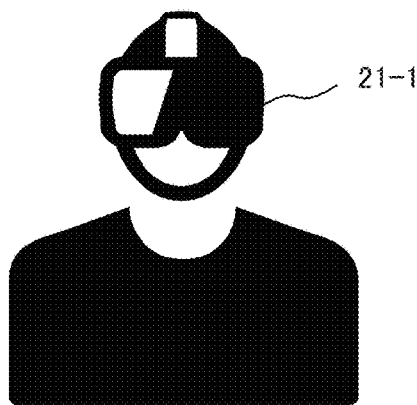
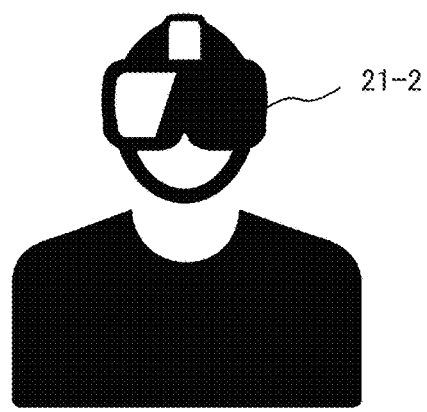
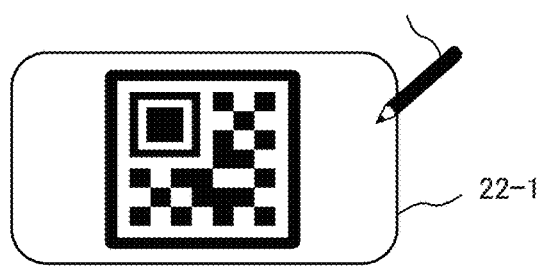
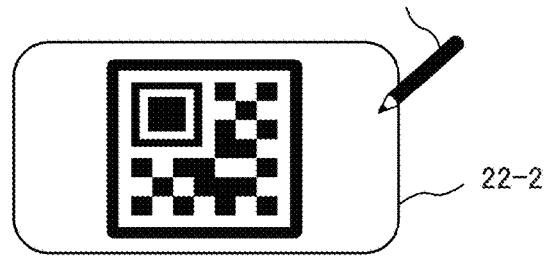

OUTPUT CONTROL SYSTEM, OUTPUT CONTROL METHOD, AND RECORDING MEDIUM

This application is a National Stage Entry of PCT/JP2022/001549 filed on Jan. 18, 2022, the contents of all of which are incorporated herein by reference, in their entirety.

TECHNICAL FIELD

The present disclosure relates to an output control system and the like.

BACKGROUND ART

There is a technique for displaying characters, images, and the like in a virtual space.

PTL 1 discloses a technique in which a tracker is attached to an electronic pen or a digitizer, the tracker monitors reception of infrared laser light with a sensor, and when the sensor detects the reception of the infrared laser light, a light emitting unit including a light emitting diode (LED) is turned on. PTL 1 discloses a technique in which a light emission tracking device detects light emission of a light emitting unit of a tracker to detect a position of an electronic pen mounted with the tracker in a motion detection target spatial region.

CITATION LIST

Patent Literature

PTL 1: JP 2019-046458 A

SUMMARY OF INVENTION

Technical Problem

A user wearing a head mounted display (HMD) cannot see the tablet. Therefore, the position of the tablet may not be recognized. Therefore, in order to cause the user to recognize the position of the tablet, the position of the tablet may be specified. For example, when the position of the tablet is specified by infrared rays, the accuracy of specifying the position of the tablet may be low.

An example of an object of the present disclosure is to provide an output control system and the like to improve accuracy in specifying the position of a tablet.

Solution to Problem

An output control system according to an aspect of the present disclosure includes a specifying means for specifying a position of a tablet by recognizing a code displayed on the tablet in a real space using an imaging device and a first output control means for displaying a shape representing an input region of the tablet whose position has been specified in a virtual space in a head mounted display.

An output control method according to an aspect of the present disclosure includes specifying a position of a tablet by recognizing a code displayed on the tablet in a real space using an imaging device and displaying a shape representing an input region of the tablet whose position has been specified in a virtual space in a head mounted display.

A program according to an aspect of the present disclosure causes a computer to specify a position of a tablet by recognizing a code displayed on the tablet in a real space using an imaging device and display a shape representing an input region of the tablet whose position has been specified in a virtual space in a head mounted display.

The program may be stored in a non-transitory computer-readable recording medium.

Advantageous Effects of Invention

According to the present disclosure, it is possible to improve the accuracy of specifying the position of the tablet.

BRIEF DESCRIPTION OF DRAWINGS

FIG. 12 is an explanatory diagram illustrating an example in which a code and identification information of an HMD are associated with each other.

EXAMPLE EMBODIMENT

Hereinafter, example embodiments of an output control system, an output control method, a program, and a non-transitory recording medium recording the program according to the present disclosure will be described in detail with reference to the drawings. The present example embodiment does not limit the disclosed technology.

Figure 1:
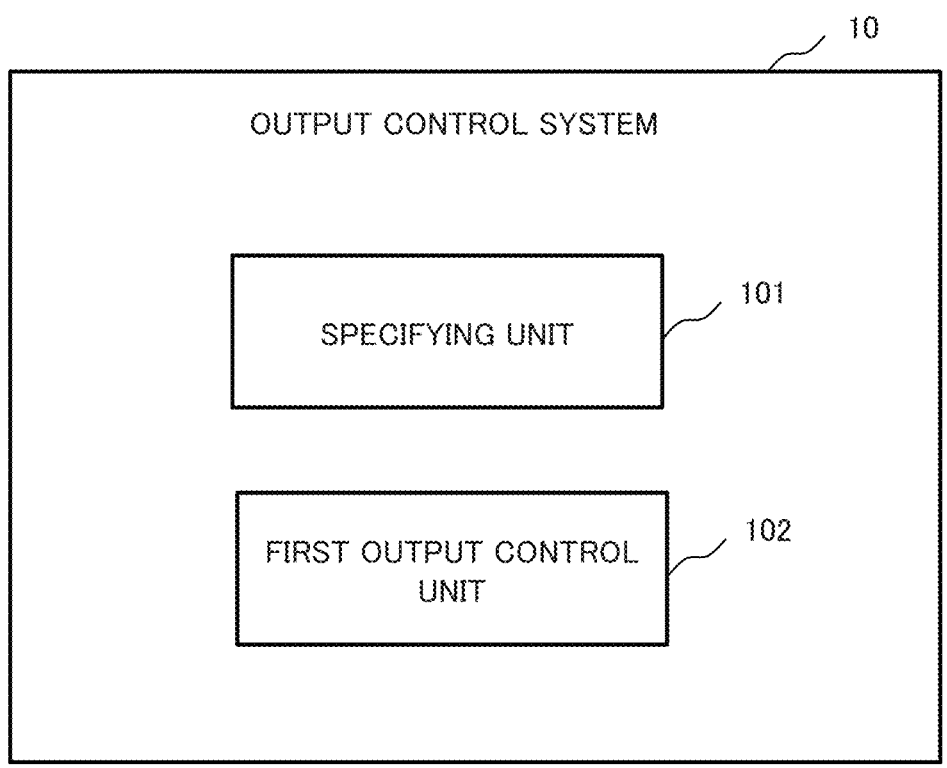
FIG. 1 is a block diagram illustrating a configuration example of an output control system according to a first example embodiment.

(First Example Embodiment) First, in a first example embodiment, a basic function of an output control system will be described. FIG. 1 is a block diagram illustrating a configuration example of an output control system according to a first example embodiment.

An output control system 10 includes a specifying unit 101 and a first output control unit 102. The specifying unit 101 has a function of specifying the position of a tablet. The first output control unit 102 has a function of controlling display on a head mounted display. Hereinafter, the head mounted display is abbreviated as an HMD (Head Mounted Display).

Here, the tablet is a device capable of performing a pointing operation using a pointing device. Examples of the pointing device include a pen-type device. The type and shape of the pointing device are not particularly limited, but hereinafter, a pen-type device will be described as an example of the pointing device. The pen-type device is also referred to as an electronic pen. For example, a tablet is a device that reads a position pointed by an electronic pen with a sensor built in the tablet and transmits at least one of information on the pointed position and information on motion to the output control system 10. The output control system 10 acquires, for example, at least one of position information and motion information as writing on the tablet. Alternatively, for example, the tablet is a device that transmits to the output control system 10 characters, numbers, and the like specified by at least one of position information and motion information. The output control system 10 may acquire characters, numbers, and the like specified by at least one of the position information and the motion information as writing on the tablet.

The specifying unit 101 specifies the position of the tablet by recognizing the code displayed on the tablet in the real space using an imaging device. The code is represented by, for example, at least one of numbers and characters. The code may be represented by a one-dimensional code or a two-dimensional code. When the code is a two-dimensional code, the position can be specified. The number of codes is not particularly limited, and may be one or more.

The code may be displayed on the tablet by attaching the code as a sticker. When the tablet is a liquid crystal tablet, the tablet may output a code. For example, in the case of a liquid crystal tablet, the code may be dynamically changed. Changing the code is not limited to changing the information represented by the code, but also includes changing the size of the code, the number of codes, the display position of the code, and the like.

The HMD may include an imaging device. Specifically, for example, the specifying unit 101 recognizes the code using an imaging device provided in the head mounted display.

Then, the specifying unit 101 specifies the position of the tablet based on the recognized code. Specifically, for example, the specifying unit 101 specifies the position of the recognized code as the position of the tablet.

The first output control unit 102 displays a shape representing the input region of the tablet whose position has been specified in the virtual space in the HMD. This shape may be referred to as an input shape.

When there is writing on the tablet, for example, the first output control unit 102 displays the writing on the tablet. Specifically, for example, the first output control unit 102 displays the writing on the tablet in the input shape. For example, when the input shape is a rectangle, the first output control unit 102 displays the writing in the rectangle. The shape representing the input region may be specified through the imaging device. When a two-dimensional code is used as the code, the two-dimensional code may include shape information indicating the input region. The color of the input shape and the color of writing may be designated by the user, and are not particularly limited.

Figure 2:
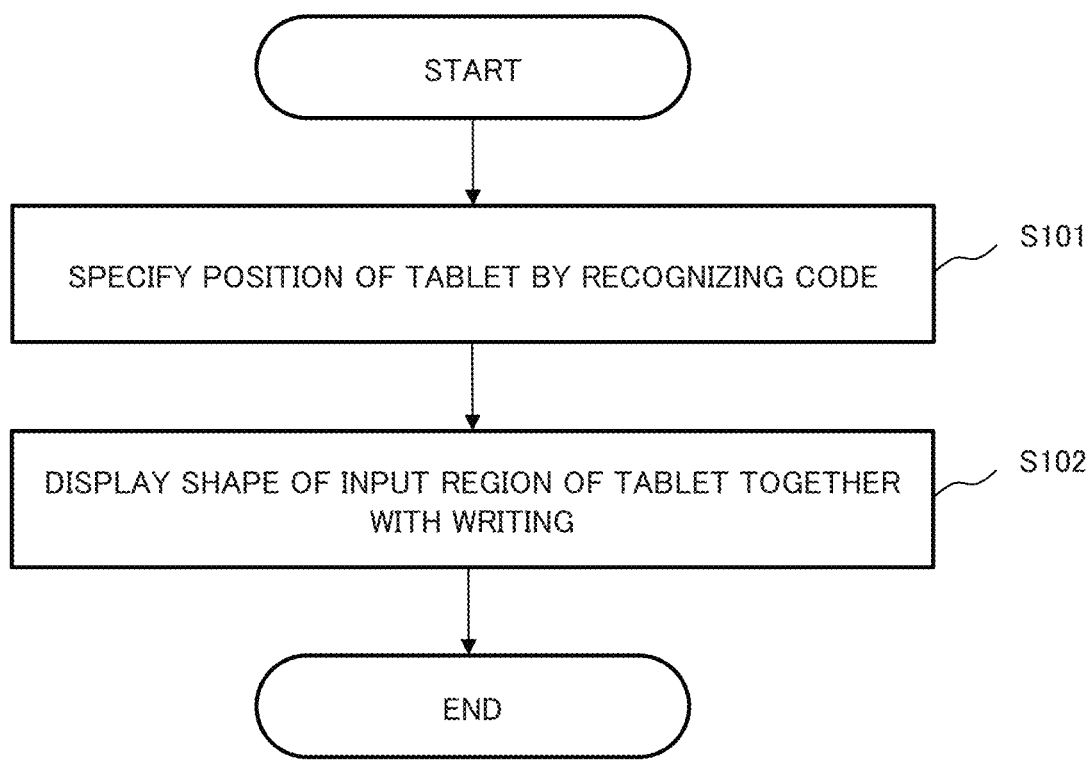
FIG. 2 is a flowchart illustrating an operation example of the output control system according to the first example embodiment.

FIG. 2 is a flowchart illustrating an operation example of the output control system 10 according to the first example embodiment. The specifying unit 101 specifies the position of the tablet by recognizing the code displayed on the tablet in the real space using the imaging device (step S101). The first output control unit 102 displays the shape representing the input region of the tablet in the virtual space of the head mounted display together with the writing on the tablet whose position has been specified (step S102).

As described above, it is conceivable that the user receives a lecture in a university, training in a company, or the like using the HMD. At this time, if the user tries to take a note on paper or the like while wearing the HMD, the user cannot see his/her hand. For this reason, the user cannot check the memo. A controller capable of performing each operation in the HMD cannot write fine characters such as those written in Therefore, it is conceivable that the user uses a tablet. a notebook.

For example, if a note written on the tablet is displayed on the HMD, the user can check the note while taking the note. However, since the user wears the HMD, the user cannot recognize the tablet in the real space.

However, when the position of the electronic pen or the tablet is specified by infrared rays, the accuracy of specifying the position of the tablet may be low. In particular, when the user wearing the HMD writes on the tablet while moving, the accuracy of specifying the position of the tablet may be low in a method of specifying the position of the tablet with infrared rays. "The user writes on the tablet while moving" includes, for example, a case where the user wearing the HMD takes a note using the tablet while moving in a facility such as a school, a store, a factory, or a warehouse. In the case of a school, the user is a student, a teacher, or the like. In the case of a store, the user is a store clerk, a customer, or the like. In the case of a factory or a warehouse, the user is a worker, an employee, or the like.

Therefore, in the first example embodiment, the output control system 10 specifies the position of the tablet by recognizing the code displayed on the tablet using the imaging device. Then, the output control system 10 displays the shape representing the input region of the tablet in the virtual space in the HMD together with the writing on the tablet. As a result, the output control system 10 can improve the accuracy of specifying the position of the tablet.

In general, imaging devices are provided in advance in many HMDs. On the other hand, the function of infrared communication may not be provided in the HMD. Therefore, the output control system 10 can improve versatility by recognizing the code using the imaging device provided in the HMD. When the function of infrared communication is not provided in the HMD, it is not necessary to separately purchase a device or the like having the function of infrared communication. As a result, cost reduction can be achieved.
(Second Example Embodiment)

Next, a second example embodiment will be described in detail with reference to the drawings. In the second example embodiment, an example of specifying the position of the tablet by recognizing the code will be described in more detail. Hereinafter, description of contents overlapping the above description will be omitted to the extent that the description of the second example embodiment is not unclear.

Figure 3:
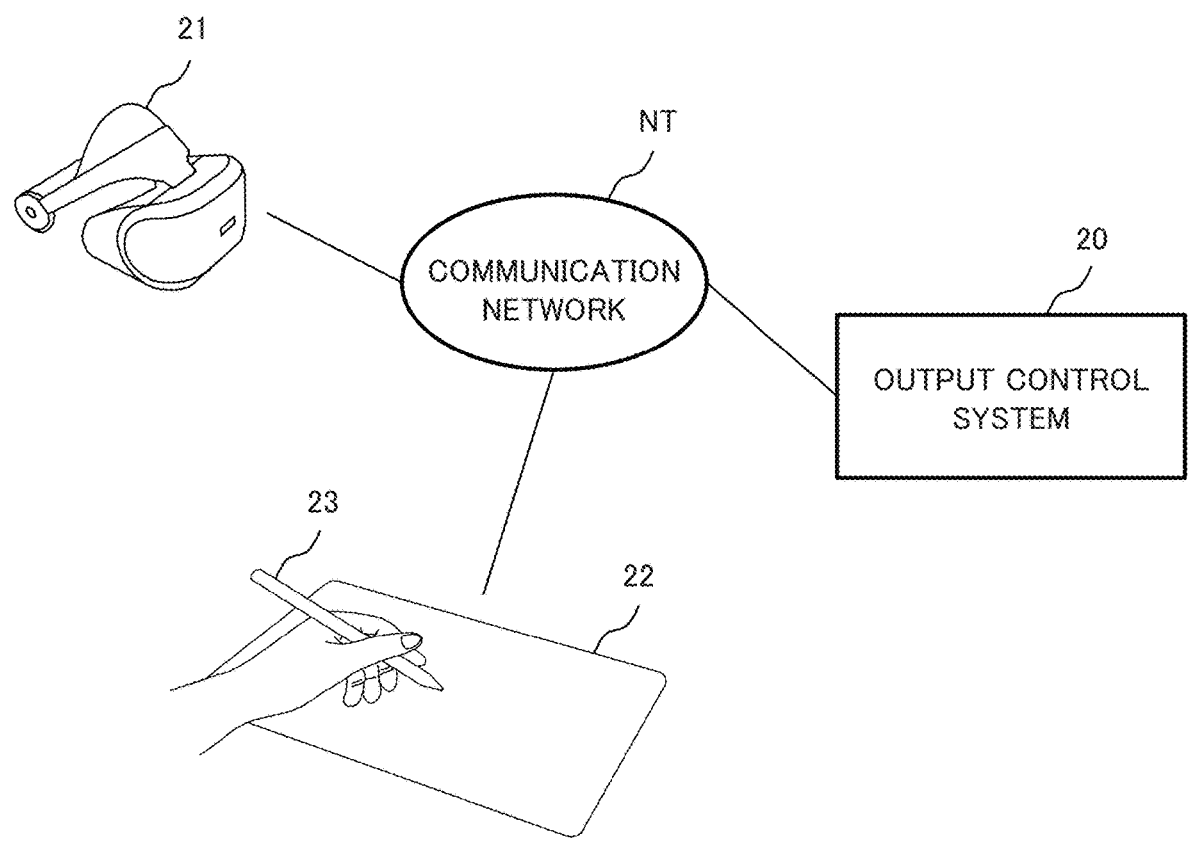
FIG. 3 is an explanatory diagram illustrating an example of connection between the output control system and each device.

FIG. 3 is an explanatory diagram illustrating an example of connection between the output control system and each device. The output control system 20 is connected to the HMD 21 through, for example, a communication network NT. The output control system 20 is connected to the tablet 22 through, for example, the communication network NT. The communication network NT connected to the HMD 21 and the communication network NT connected to the tablet 22 may be the same or different, and are not particularly limited.

As described above, the tablet 22 reads the position pointed by an electronic pen 23 with a sensor built in the tablet 22. Then, the tablet 22 transmits at least one of the information on the pointed position and the information on the motion as writing to the output control system 20 through the communication network NT. Alternatively, the tablet 22 transmits characters, numbers, and the like specified by these pieces of information as writing to the output control system 20 through the communication network NT.

The type of the HMD 21 is not particularly limited, but for example, the HMD 21 includes an imaging device. The HMD 21 is worn by the user. For example, the user may walk, stop, or sit while wearing the HMD 21.

Figure 4:
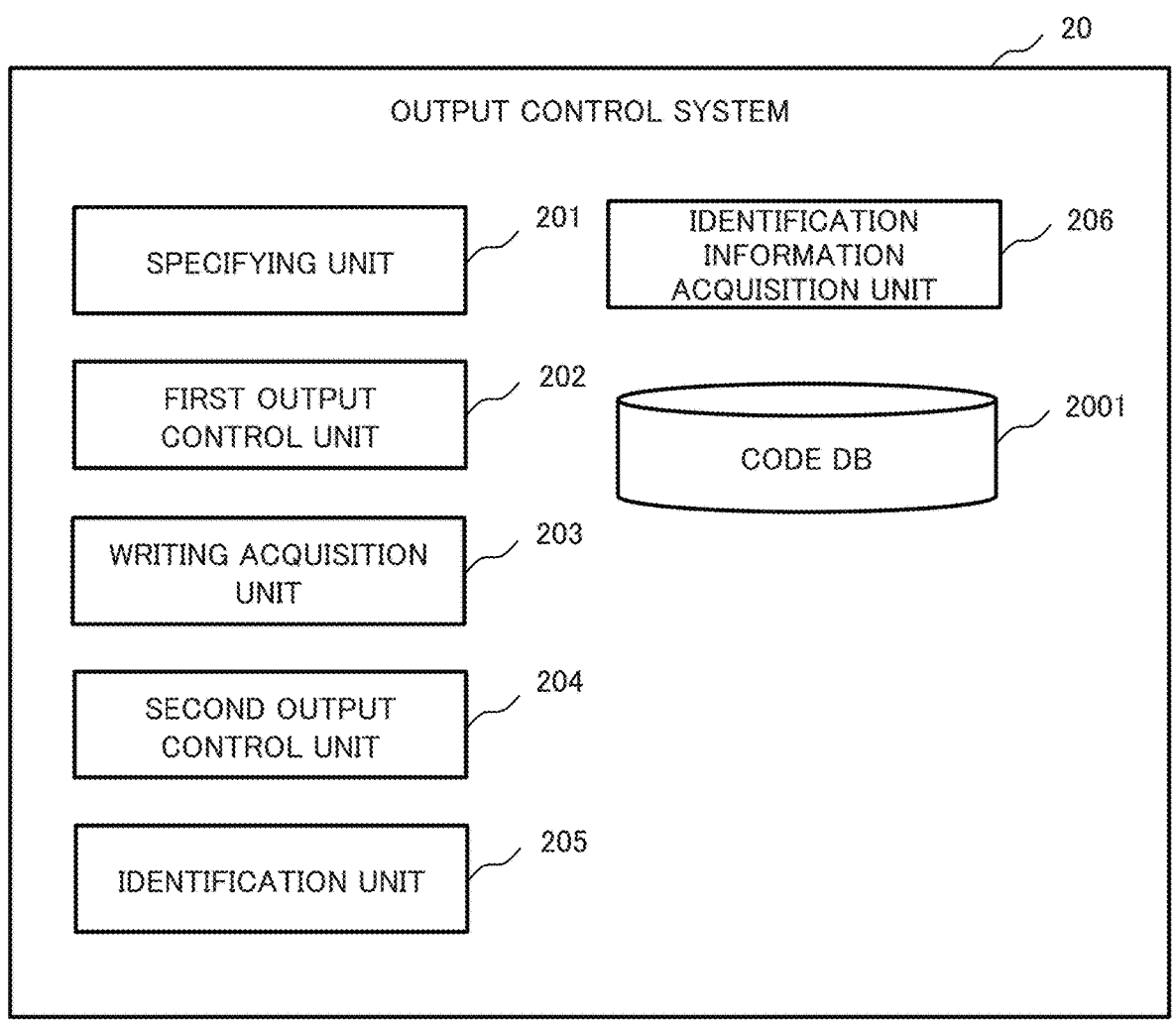
FIG. 4 is a block diagram illustrating a configuration example of an output control system according to a second example embodiment.

FIG. 4 is a block diagram illustrating a configuration example of the output control system 20 according to the second example embodiment. The output control system 20 includes a specifying unit 201, a first output control unit 202, a writing acquisition unit 203, a second output control unit 204, an identification unit 205, and an identification information acquisition unit 206. The output control system 20 further includes the writing acquisition unit 203, the second output control unit 204, the identification unit 205, and the identification information acquisition unit 206 in addition to the output control system according to the first example embodiment. The specifying unit 201 has the function of the specifying unit 101 in the first example embodiment as its basic function. The first output control unit 202 has the function of the first output control unit 102 in the first example embodiment as its basic function.

The output control system 20 includes, for example, a code DB 2001. For example, the code DB 2001 stores, for each tablet 22, identification information for identifying the tablet 22 and a code in association with each other. Therefore, the tablet 22 and the code can be associated with each other. When a plurality of codes are used for each tablet 22, the code DB 2001 stores, for each tablet 22, a plurality of codes and identification information for identifying the tablet 22 in association with each other. For example, when the code is a two-dimensional code, the code DB 2001 may store, for each tablet 22, identification information for identifying the tablet 22, the code, and various kinds of information included in the code in association with each other. For example, when the code is a two-dimensional code, the code may include information on the size of the tablet 22, information on the size of the code, identification information for identifying the HMD 21 associated in advance with the tablet 22, and the like, and the information included in the code is not particularly limited.

The number of codes displayed on the tablet 22 is not particularly limited, and may be one or more. The size of the code is not particularly limited. As described in the first example embodiment, a code may be displayed on the tablet 22 by attaching the code as a sticker. When the tablet 22 is a liquid crystal tablet, the tablet 22 may output a code. An example in which the second output control unit 204 controls the display of the tablet 22 when the tablet 22 is a liquid crystal tablet will be described later.

<Display Example of Code>

Here, a display example of the code will be described with reference to FIGS. 5 to 7.

Figure 5:
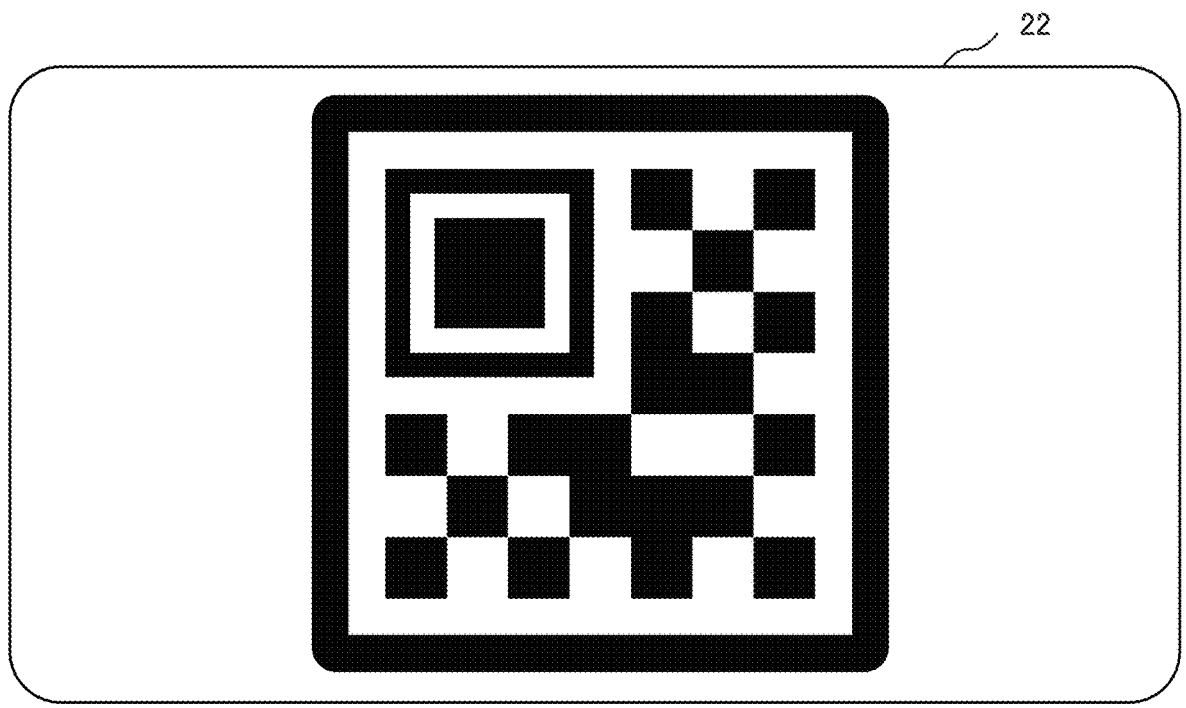
FIG. 5 is an explanatory diagram illustrating a display example of one code.

FIG. 5 is an explanatory diagram illustrating a display example of one code. As illustrated in FIG. 5, one code may be displayed on the tablet 22. For example, in FIG. 5, one code may be displayed so as to cover the entire tablet 22.

Since the code having a larger size is displayed on the tablet 22, the code is more easily recognized even if the user is away from the tablet 22. The size of the code may be treated as the size of the tablet 22.

Figure 6:
FIG. 6 is an explanatory diagram illustrating a display example 1 of a plurality of codes.

FIG. 6 is an explanatory diagram illustrating a display example 1 of a plurality of codes. As illustrated in FIG. 6, the number of the plurality of codes is 4, and the plurality of codes are displayed at four corners of the tablet 22. The number of codes is not limited to the example of FIG. 6, and a plurality of codes may be distributed and displayed at different positions. For example, when the number of codes is 3, three-point positioning is used, and the position of the tablet 22 can be specified more accurately.

Figure 7:
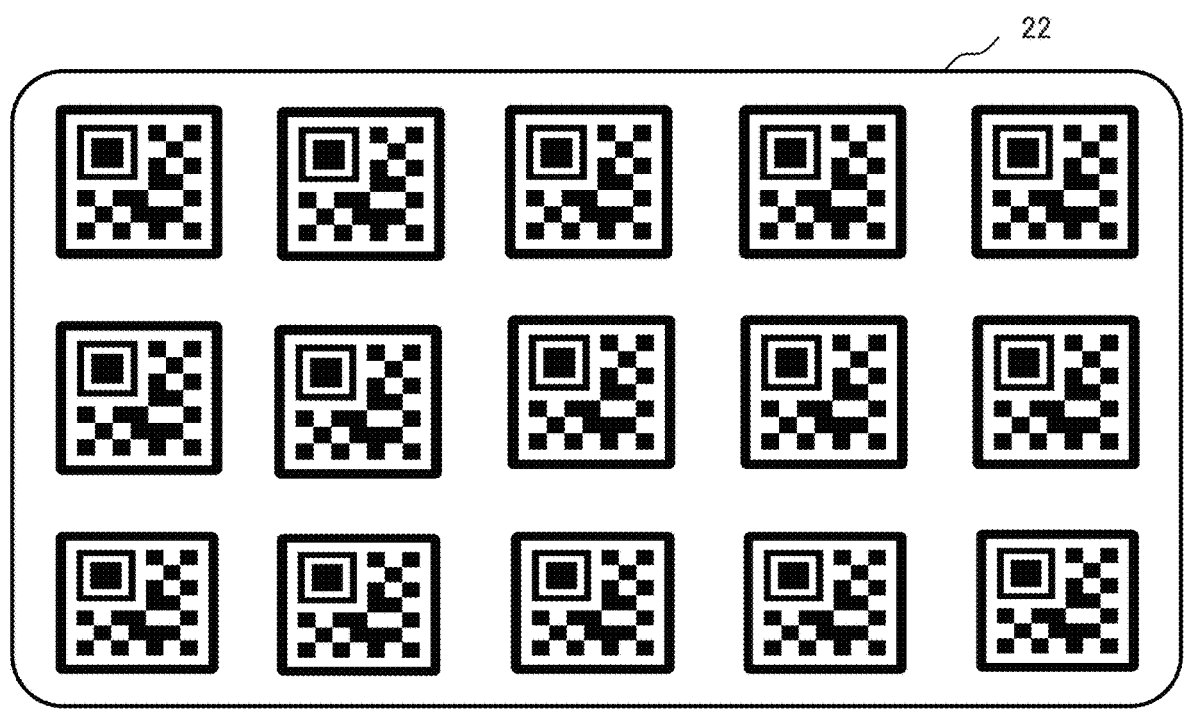
FIG. 7 is an explanatory diagram illustrating a display example 2 of a plurality of codes.

FIG. 7 is an explanatory diagram illustrating a display example 2 of a plurality of codes. As shown in FIG. 7, the plurality of codes may be displayed to fill the tablet 22. In the example of FIG. 7, the number of the plurality of codes is 15, but the number of the plurality of codes is not particularly limited.

Returning to the description of FIG. 4, the specifying unit 201 specifies the position of the tablet 22 by recognizing the code displayed on the tablet 22 in the real space using the imaging device. The specifying unit 201 may continuously specify the position of the tablet 22. That is, the specifying unit 201 may track the tablet 22. Alternatively, the specifying unit 201 may specify the position of the tablet a predetermined number of times at a specific timing. Alternatively, the specifying unit 201 may be a combination thereof. For example, the specifying unit 201 may specify the position of the tablet only once when the user starts using the tablet. The start of use may be a timing designated by the user or may be the start of use of the HMD 21. For example, the specifying unit 201 may specify the position of the tablet once at the start of use and then specify the position of the tablet every predetermined time. That is, the specifying unit 201 may track the tablet. For example, when the HMD 21 includes a sensor capable of detecting the movement of the user, the specifying unit 201 may newly specify the position of the tablet 22 when the specifying unit 201 is away from the position at which the code is recognized. Thus, the timing at which the specifying unit 201 specifies the position of the tablet is not particularly limited.

Figure 8:
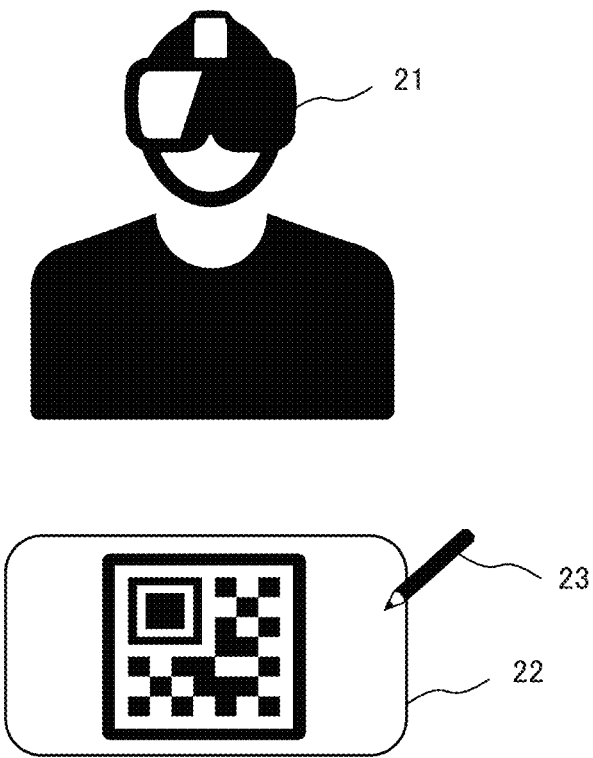
FIG. 8 is an explanatory diagram illustrating an example of recognizing a code.

FIG. 8 is an explanatory diagram illustrating an example of recognizing a code. The specifying unit 201 recognizes the code displayed on the tablet 22 using the imaging device of the HMD 21. Then, the specifying unit 201 specifies the position of the tablet 22 based on the recognized code. Specifically, the specifying unit 201 may specify the position of the recognized code as the position of the tablet 22.

<Specific Example of Distance>

The specifying unit 201 may specify the distance from the imaging device to the code based on the imaged code. Specifically, for example, when the size of the code is determined in advance, the specifying unit 201 specifies the distance from the imaging device to the code based on the ratio between the recognized size of the code and the actual size of the code.

<Specific Example of Inclination >

The specifying unit 201 may specify the inclination of the tablet 22 with the recognized code. Specifically, for example, if the vertical size and the horizontal size of the code are determined in advance, the specifying unit 201 can specify the inclination of the tablet 22 based on the ratio between the vertical size and the horizontal size of the recognized code and the ratio between the vertical size and the horizontal size of the actual code.

As the number of codes is larger, the inclination is more accurately specified. When the shape of the tablet 22 is a quadrangle and the right and left are defined, the specifying unit 201 can specify the inclination of the left side of the tablet 22 by comparing the ratio between the vertical and horizontal sizes of the code displayed on the left side of the tablet 22 with the ratio between the vertical and horizontal sizes of the recognized code. Then, the specifying unit 201 can specify the inclination of the right side of the tablet 22 by comparing the ratio between the vertical and horizontal sizes of the code displayed on the right side of the tablet 22 with the ratio between the vertical and horizontal sizes of the code recognized on the right side. When the plurality of codes are arranged at different positions, the codes are not limited to being displayed on the right and left, and upper and lower codes may be used, or upper and lower codes and right and left codes may be used.

<Specific Example of Shape of Input Region>

The specifying unit 201 may specify the shape of the input region of the tablet 22 using the imaging device. The shape of the input region may be determined in advance. As described in the first example embodiment, for example, when the two-dimensional code is used, the two-dimensional code may include information indicating the shape of the input region, and the specifying unit 201 may acquire the information indicating the shape of the input region included in the two-dimensional code by recognizing the two-dimensional code.

Alternatively, a case where the length and width of the code and the length and width of the input region of the tablet 22 are determined in advance and the ratio between the length size and the width size of the code and the ratio between the length size and the width size of the input region of the tablet 22 are determined in advance will be described as an example. The specifying unit 201 specifies the vertical horizontal size of the tablet 22 based on the vertical size and the vertical ratio of the recognized code, and specifies the vertical size of the tablet 22 based on the horizontal size and the horizontal ratio of the recognized code. As a result, the specifying unit 201 can specify the shape of the input region of the tablet 22.

Alternatively, the specifying unit 201 may specify the shape of the input region of the tablet 22 in which the code is recognized using the imaging device of the HMD 21. Here, for example, the specifying unit 201 may specify the shape of the tablet 22 as the shape of the input region.

Then, the writing acquisition unit 203 acquires the data as writing on the tablet 22 whose position has been specified. As described above, the writing acquisition unit 203 acquires, for example, at least one of position information and motion information as writing on the tablet 22.

<Display on HMD 21>

The first output control unit 202 displays on the HMD 21 a shape representing the input region of the tablet 22 whose position has been specified. The first output control unit 202 displays on the HMD 21 the writing in the input shape. When there is no writing, the first output control unit 202 may display the input shape.

The first output control unit 202 may display a picture. The shape of the picture may be any input shape, and the type of the picture is not particularly limited, such as a blackboard or a notebook. The picture may be designated by the user. For example, pictures may be prepared in advance for each use scene of the virtual space. Then, the first output control unit 202 sets the shape of the picture relevant to the use scene of the user as an input shape, and displays the picture on the HMD 21. The use scene may be designated by the user or may be automatically detected. For example, when the user is studying or receiving training, the tablet 22 is expressed by the picture on the note, so that a situation in which the user is studying while taking a note using a note in the real space or a situation in which the user is receiving training can be reproduced in the virtual space.

Next, an example of displaying the input shape based on the aspect ratio of the input region of the tablet 22 will be described. For example, the first output control unit 202 may display the input region in a predetermined size in the virtual space based on the aspect ratio of the input region of the tablet 22. More specifically, for example, the first output control unit 202 displays the input region in a predetermined size in the virtual space so as to have the same ratio as the aspect ratio of the input region of the tablet 22. The same ratio includes substantially the same ratio. For example, being substantially the same is not particularly limited as long as the user can recognize that the aspect ratio of the input region of the tablet 22 and the aspect ratio of the input region in the virtual space are the same. The predetermined size is not particularly limited, and may be the size of the real space, may be a size enlarged from the size of the real space, may be a size reduced from the size of the real space, or may be a size designated by the user. For example, the predetermined size may be switchable by the user while being displayed on the HMD 21.

Next, an example of displaying an input shape corresponding to the distance of the tablet 22 will be described. When the distance of the tablet 22 is specified, for example, the output control system 20 displays an input shape corresponding to the specified distance in the virtual space. Specifically, for example, the output control system 20 displays the input shape so as to be at a position corresponding to the specified distance in the virtual space. More specifically, the input shape is displayed in the virtual space such that the shorter the specified distance, the shorter the distance from the user to the input shape. For example, the output control system 20 displays the input shape in the virtual space such that the longer the specified distance in the virtual space, the longer the distance from the user to the input shape. For example, when the user is moving in the real space, the distance from the user to the input shape in the virtual space changes according to the specified distance, so that the user can feel as if the user is moving in the virtual space.

Next, an example of displaying the input shape based on the inclination of the tablet 22 will be described. When the inclination of the tablet 22 is specified, for example, the first output control unit 202 displays the input shape in the virtual space so as to have the same inclination as the specified inclination. Therefore, the user can check the posture of tablet 22.

For example, the first output control unit 202 may display the shape representing the input region of the tablet 22 and the writing on the tablet 22 at the position in the virtual space corresponding to the position of the tablet 22. For example, since the user wears the HMD 21, the user cannot recognize the position of the tablet 22 in the real space. For this reason, the first output control unit 202 may highlight the position in the virtual space corresponding to the position of the tablet 22. Therefore, the user can easily recognize the position of the tablet 22 in the real space.

Figure 9:
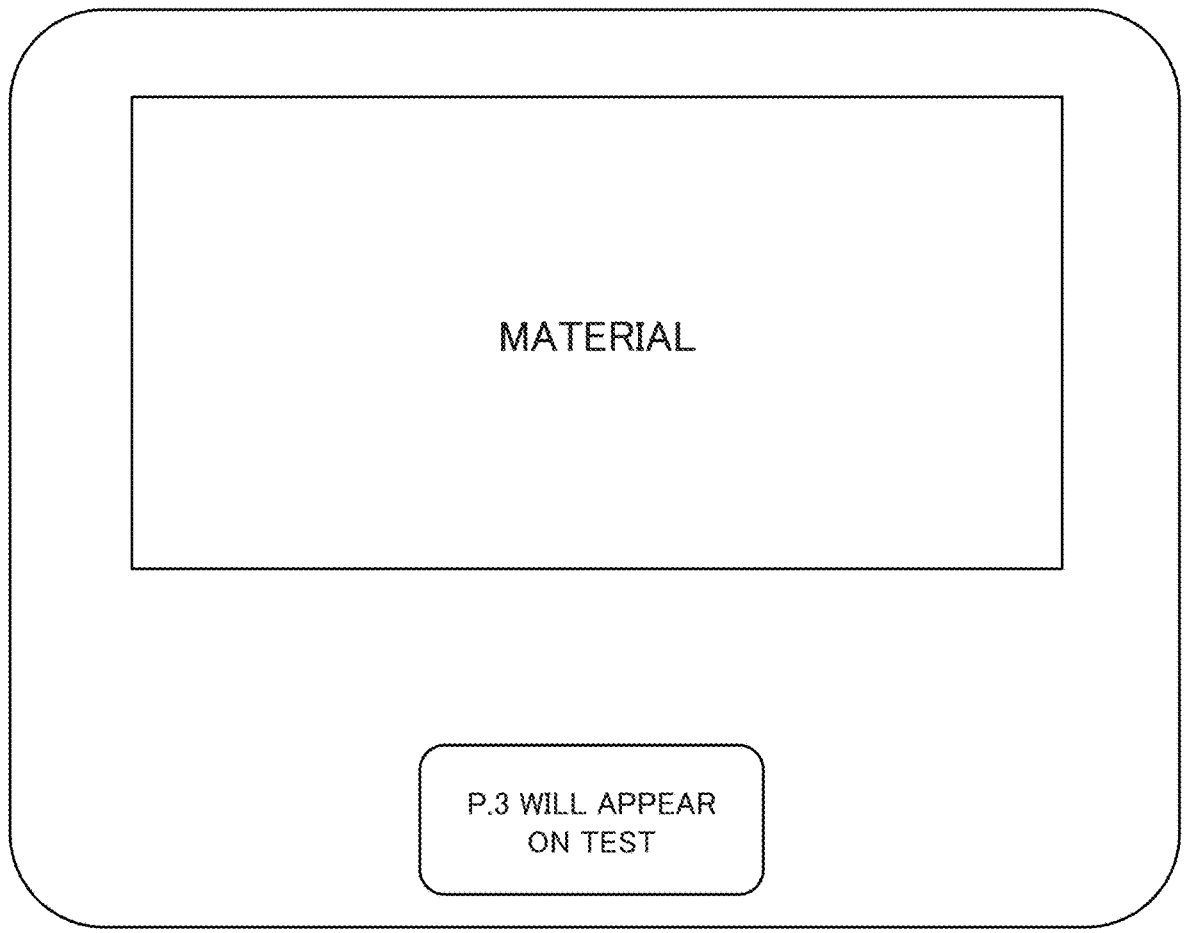
FIG. 9 is an explanatory diagram illustrating an example of displaying writing on an HMD.

FIG. 9 is an explanatory diagram illustrating an example of displaying writing on the HMD 21. For example, in FIG. 9, the HMD 21 displays material in a virtual space. The HMD 21 displays a shape representing the input region of the tablet 22 in the virtual space. The HMD 21 displays writing in a shape representing the input region in the virtual space. In FIG. 9, "P.3 will appear on the test" is displayed in the shape representing the input region in the virtual space.

<Tracking of Electronic Pen 23>

Returning to the description of FIG. 4, specifying unit 201 may further track the electronic pen 23 that can operate the tablet 22. Specifically, for example, the specifying unit 201 specifies the position of the electronic pen 23 by infrared communication using the HMD 21.

Alternatively, for example, the specifying unit 201 may specify the position of the electronic pen 23 by image recognition using the imaging device of the HMD 21.

The first output control unit 202 further displays a mark indicating the specified electronic pen 23 or a contact point of the electronic pen 23 in the virtual space. Here, displaying the electronic pen 23 means, for example, displaying an image of the electronic pen 23, a model obtained by modeling the electronic pen 23, and the like. The contact point of the electronic pen 23 is a point of contact with the tablet 22.

If the movement of the electronic pen 23 is too fast, it may be difficult for the user to see the mark indicating the electronic pen 23 or the electronic pen 23 displayed on the HMD 21. Therefore, the first output control unit 202 displays the electronic pen 23 or the mark indicating the electronic pen 23 at predetermined intervals. The predetermined interval only needs to be an interval that is easy for the user to see, may be determined by the user, and is not particularly limited.

Figure 10:
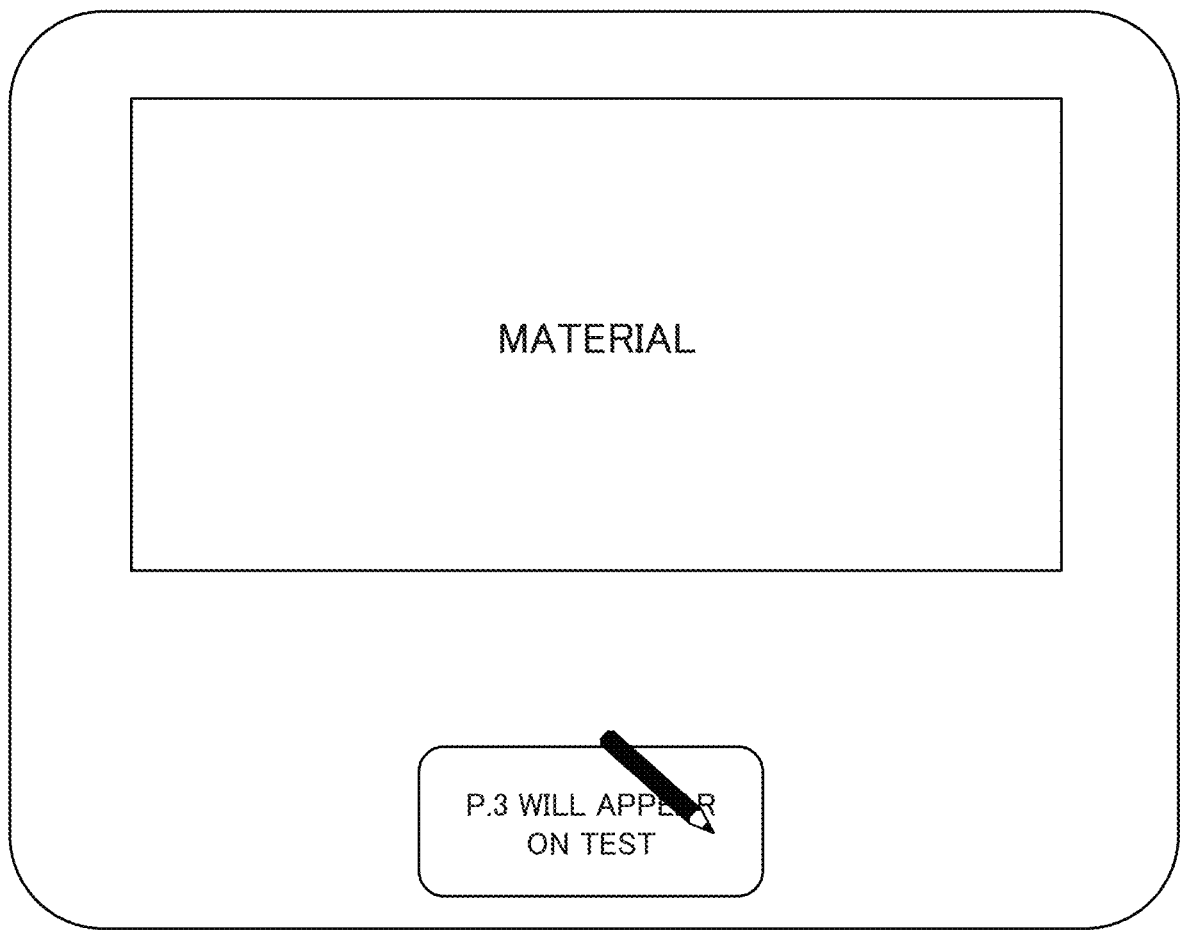
FIG. 10 is an explanatory diagram illustrating an example of displaying an electronic pen on an HMD.

FIG. 10 is an explanatory diagram illustrating an example of displaying the electronic pen 23 on the HMD 21. In FIG. 10, the electronic pen 23 is further displayed on the HMD 21, compared to FIG. 9. Therefore, since the movement of the electronic pen 23 is visualized, the user can check the operation by the user.

<Display Example of Code by Liquid Crystal Tablet>

As described above, a liquid crystal tablet may be used as the tablet 22. When the tablet 22 is a liquid crystal tablet, the second output control unit 204 controls the display of the tablet 22. For example, when the tablet 22 is a liquid crystal tablet, the second output control unit 204 may display a code on the tablet 22. Generally, writing on the tablet 22 is displayed on the liquid crystal tablet, but when the code is displayed on the tablet 22, the second output control unit 204 displays the code on the tablet 22 and does not display writing on the tablet 22. Alternatively, the second output control unit 204 may display the code on the tablet 22 and display the writing on the tablet 22 on the tablet 22 so that the code is not hidden.

For example, the second output control unit 204 may display a predetermined size, a predetermined number, and a code at a predetermined display position.

For example, the second output control unit 204 may display the code so as to have a size, a number, and a display position according to the distance from the HMD 21 to the tablet 22.

<Modification Example of Code by Liquid Crystal Tablet>

When a liquid crystal tablet is used as the tablet 22, the second output control unit 204 may dynamically change the code. As an example of changing the code, the second output control unit 204 changes at least one of the size of the code, the number of codes, and the display position of the code.

Here, the timing at which the second output control unit 204 changes the code is not particularly limited. For example, the second output control unit 204 may change the code when the code is not recognized for a predetermined time. Here, an example in which the number of codes and the size of the code are changed when the code is not recognized for a predetermined time will be described with reference to FIG. 11.

Figure 11:
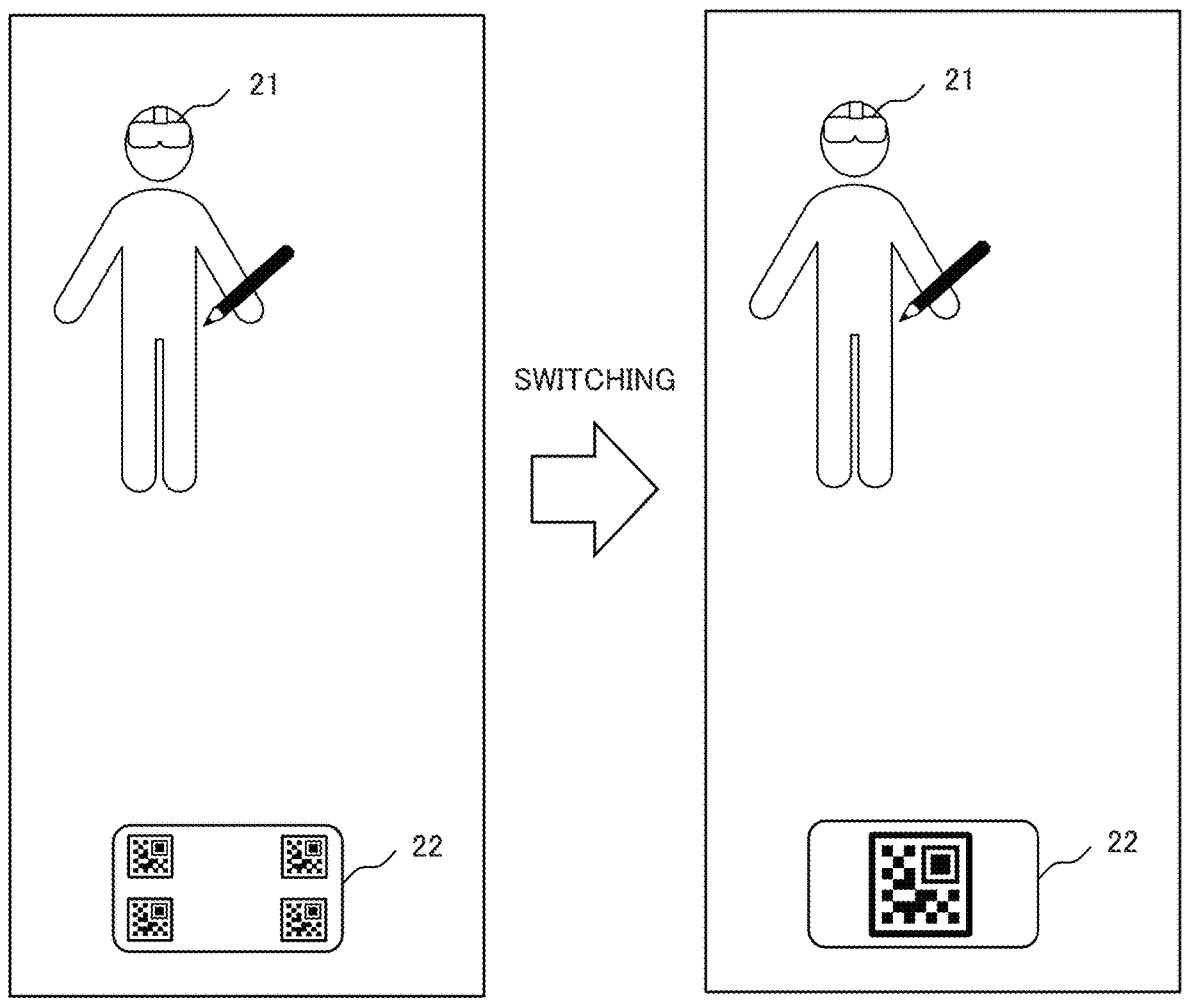
FIG. 11 is an explanatory diagram illustrating an example of code switching.

FIG. 11 is an explanatory diagram illustrating an example of code switching. In FIG. 11, the second output control unit 204 displays four codes at four corners of the tablet 22. For example, the user wearing the HMD 21 may be at a position away from the tablet 22 at a predetermined location in the real space. The predetermined space may be outdoors or indoors. For example, the predetermined space may be a store, a school, or the like, and is not particularly limited.

Since the user is at a position away from the tablet 22, the specifying unit 201 cannot recognize the code using the imaging device of the HMD 21. Therefore, for example, when the specifying unit 201 cannot recognize the predetermined time code, the second output control unit 204 sets the number of codes to one and increases the size of the code, so that one code is displayed to cover the entire tablet 22. This makes it easier for the user to recognize the code even if the user is at a position away from the tablet 22.

As described above, as the number of codes is larger, the accuracy of specifying the inclination of the tablet 22 is more improved. Therefore, as another timing example of changing the code, the second output control unit 204 may change the code when the distance from the HMD 21 to the tablet 22 is shorter than a predetermined distance from a case where the distance is the predetermined distance or more. This case is, for example, a case where the user approaches the tablet 22. More specifically, for example, in this case, the second output control unit 204 may change the display of the tablet 22 from the code illustrated in FIG. 5 to the code illustrated in FIG. 7 or the code illustrated in FIG. 6. For example, in FIG. 11, when the specifying unit 201 recognizes the code, the specifying unit 201 specifies the distance from the HMD 21 to the tablet 22. Although not illustrated, the second output control unit 204 may return the number and size of the code when the distance is within a predetermined distance.

If the distance from the HMD 21 to the tablet 22 is long, it becomes difficult for the imaging device included in the HMD 21 to recognize the code. Therefore, as another timing for changing the code, the second output control unit 204 may change the code when the distance from the HMD 21 to the tablet 22 is a predetermined distance or more from a case where the distance is shorter than the predetermined distance. That is, this case is, for example, a case where the user moves away from the tablet 22. Specifically, for example, the second output control unit 204 may change the number of codes to be reduced and the size of the code to be increased. More specifically, for example, the second output control unit 204 may change the display of the tablet 22 from the code illustrated in FIG. 7 or the code illustrated in FIG. 6 to the code illustrated in FIG. 5.

For example, the user wearing the HMD 21 may move. Therefore, as another timing for changing the code, in a case where a sensor capable of detecting the movement of the user is provided in the HMD 21, when it is detected that the specifying unit 201 has moved away from the position at which the code is recognized, the second output control unit 204 may change the code. For example, in a case where the distance from the HMD 21 to the tablet 22 is short, when the movement of the user is detected, the second output control unit 204 may change the size of the code to be increased. The second output control unit 204 may reduce the number of codes in order to increase the size of the code.

The present invention is not limited to the example of FIG. 11, and when the code is not recognized for a predetermined time, there is a case where a hand or the like hides the code and the code cannot be recognized by the imaging device. For example, when the code cannot be recognized for a predetermined time or more after the code is recognized at least once, the second output control unit 204 may change the code. In such a case, the second output control unit 204 may display, for example, a code having a small size.

When the code cannot be recognized for a predetermined time or more after the code is recognized at least once, the identification unit 205 may identify whether a part of the user such as a hand has been captured by the imaging device. For example, when a part of the user is captured, the second output control unit 204 may change the code.

Alternatively, the identification unit 205 identifies whether a part of the user has been captured by the imaging device. Then, when it is identified that a part of the user has been captured, the second output control unit 204 may change the code.

Alternatively, the present invention is not limited to the example in which the code is changed when a part of the user is identified as being captured or when the code is not recognized for a predetermined time, and the first output control unit 202 may notify the user that the code is hidden by the part of the user.

When the code cannot be recognized for a long time, it is conceivable that the user has lost sight of the tablet 22. Therefore, when the code cannot be recognized for the second predetermined time or more, the first output control unit 202 may switch the display of the virtual space to the display of the video captured by the imaging device on the HMD 21. This makes it easier for the user to find the tablet 22.

When the user faces backward, the imaging device may not be able to image the code of the tablet 22. Therefore, the sensor included in the HMD 21 may detect that the back is directed to the tablet 22, or may detect a change in the direction of the head. Then, the first output control unit 202 may notify the user that the tablet 22 is located behind according to these detection results.

<Example of Preventing Peeping>

There may be a plurality of tablets 22. For example, when a plurality of students are in a classroom, there are the tablets 22 and the HMDs 21 respectively corresponding to the plurality of students.

In such a case, there is a case where the student tries to recognize the code displayed on the tablet 22 of another student using the imaging device of the HMD 21 worn by the student in order to view the content written on the tablet 22 of the another student.

Therefore, the code DB 2001 may store the code, the identification information of the tablet 22, and the identification information of the HMD 21 in association with each other. As a result, the tablet 22 and the code can be associated with the HMD 21. The identification information acquisition unit 206 acquires identification information of the HMD 21 including the imaging device worn by the user. Then, when the code is recognized, the specifying unit 201 compares the identification information of the HMD 21 associated with the recognized code with the acquired identification information in the code DB 2001.

Then, when the identification information of the HMD 21 associated with the recognized code matches the acquired identification information of the HMD 21, the first output control unit 202 displays the shape representing the input region of the tablet 22 to the virtual space in the HMD 21 together with writing on the tablet 22.

On the other hand, when the identification information of the HMD 21 associated with the recognized code does not match the acquired identification information, the first output control unit 202 does not display the shape representing the writing on the tablet 22 and the input region of the tablet 22 in the virtual space in the HMD 21.

FIG. 12 is an explanatory diagram illustrating an example in which a code and identification information of the HMD 21 are associated with each other. In FIG. 12, there are two users, a user A and a user B.

The user A wears an HMD 21-1 and uses an electronic pen 23-1. The HMD 21-1 is associated with the tablet 22-1. Specifically, for example, the code DB 2001 stores a code displayed on the tablet 22-1, identification information of the tablet 22-1, and identification information of the HMD 21-1 in association with each other. writing on the tablet 22-1 is displayed on the HMD 21-1.

Therefore,

The user B wears an HMD 21-2 and uses an electronic pen 23-2.

The HMD 21-2 is associated with the tablet 22-2. Specifically, for example, the code DB 2001 stores a code displayed on the tablet 22-2, identification information of the tablet 22-2, and identification information of the HMD 21-2 in association with each other. Therefore, writing on the tablet 22-2 is displayed on the HMD 21-2.

Here, it is assumed that the user B looks at the code displayed on the tablet 22-1 through the HMD 21-2. At this time, the specifying unit 201 recognizes the code displayed on the tablet 22-1 using the imaging device of the HMD 21-2. The identification information acquisition unit 206 acquires identification information of the HMD 21-2. The specifying unit 201 compares the identification information of the HMD 21-1 associated with the recognized code with the identification information of the HMD 21-2. Since these pieces of identification information do not match, the first output control unit 202 does not display on the HMD 21-2 the writing on the tablet 22-1. As a result, the user B cannot see the writing on the tablet 22-1 by the user A. At this time, the first output control unit 202 may display the input shape of the tablet 22-1 or may not display the input shape of the tablet 22-1. When the input shape is displayed, for example, the user B can grasp that the tablet is nearby. When the input shape is not displayed, for example, it is possible to make the user B not know that there is a tablet next to the user B.

When the code is a two-dimensional code, the two-dimensional code may include identification information of the HMD 21. Therefore, the specifying unit 201 can acquire the identification information of the HMD 21 corresponding to the tablet 22-1 by recognizing the code displayed on the tablet 22-1 using the imaging device of the HMD 21-2.

Then, the specifying unit 201 compares the identification information of the HMD 21 included in the two-dimensional code with the identification information of the HMD 21 including the imaging device. The first output control unit 202 controls whether to display the writing on the tablet 22 on which the code is displayed on the HMD 21 including the imaging device according to the comparison result.

This makes it possible to prevent peeping. For example, in education, cheating can be prevented. Instead of the identification information of the HMD 21, identification information of the user may be used.

Although the example in which the number of HMDs 21 associated with the tablet 22 is one has been given, there may be a plurality of HMDs 21 and there is no particular limitation. That is, the code DB 2001 may store the identification information of the tablet 22, the code displayed on the tablet 22, and the identification information of each of the plurality of HMDs 21 in association with each other. For example, the HMD 21 of each student may be associated with one tablet 22, and the HMD 21 of the teacher may be associated with each tablet 22 of a plurality of students. As a result, the student cannot see the writing on the tablet 22 of another student, but the teacher can see the writing on the tablet 22 of each student. For example, when one tablet 22 is shared by a plurality of users in a scene such as a conference, the number of HMDs 21 associated with the tablet 22 may be plural.

<Example of Controlling Output of Writing on a plurality of Tablets 22>

The present invention is not limited to the above example, and there may be a plurality of tablets 22. For example, the tablet 22 may be prepared for each company in a warehouse or a factory, or the tablets 22 may be prepared for each area. As described above, there is a case where the teacher can see the tablet 22 assigned to each of the plurality of students. In this manner, the user may be able to use a plurality of tablets 22.

First, if all the writing on each of the plurality of tablets 22 is displayed on the HMD 21 of the user, it is considered that the usability is poor. Therefore, when the specifying unit 201 newly recognizes a code, the first output control unit 202 displays the writing on the tablet 22 associated with the newly recognized code on the HMD 21. When the specifying unit 201 newly recognizes the code, the first output control unit 202 does not display on the HMD 21 the writing on the tablet 22 associated with the code recognized in the past.

Figure 13:
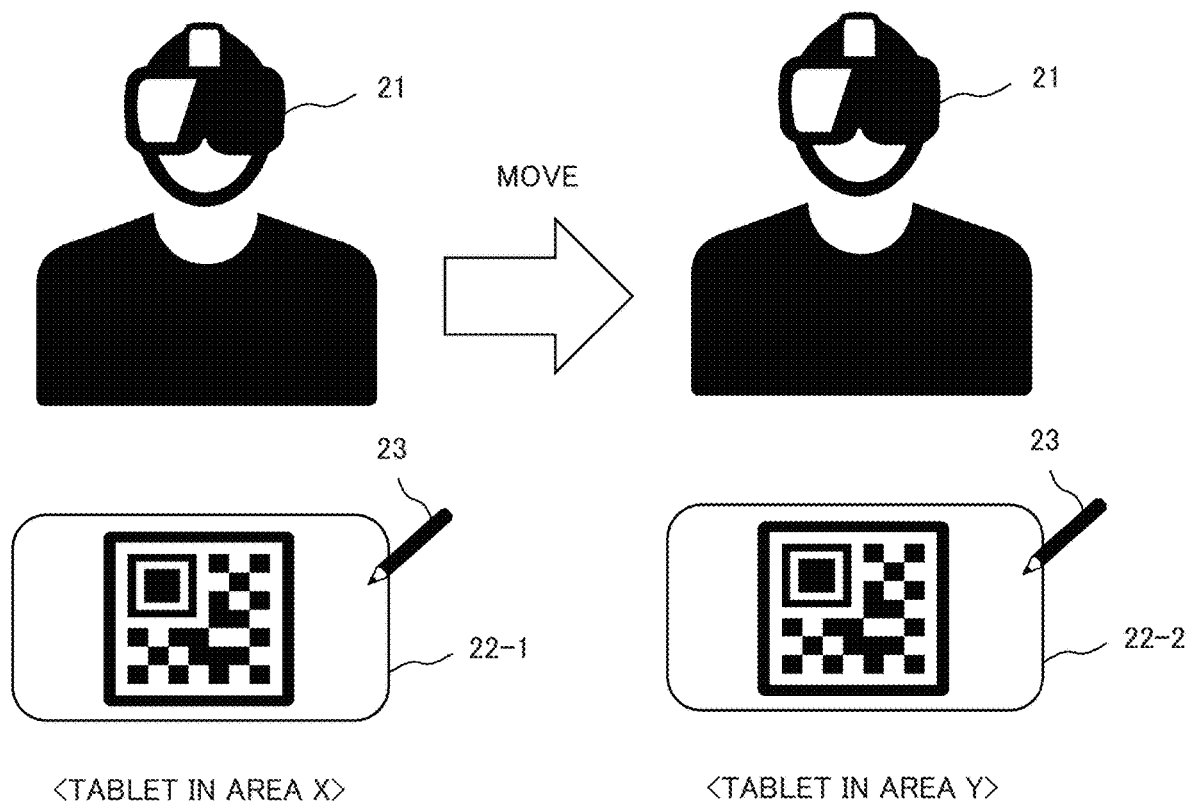
FIG. 13 is an explanatory diagram regarding output control of the HMD when there is a tablet for each area.

FIG. 13 is an explanatory diagram regarding output control of the HMD 21 when there is the tablet 22 for each area. In FIG. 13, for example, the facility includes an area X and an area Y. In FIG. 13, the tablet 22 is prepared for each area. For example, there is the tablet 22-1 in the area X, and there is the tablet 22-2 in the area Y.

For example, first, the user is in the area X. Then, the specifying unit 201 recognizes the code displayed on the tablet 22-1 through the imaging device of the HMD 21 worn by the user, for example. In such a case, the first output control unit 202 displays on the HMD 21 the writing on the tablet 22-1 associated with the recognized code. On the other hand, the user moves from the area X to the area Y, and the specifying unit 201 recognizes the code displayed on the tablet 22-2 in the area Y through the imaging device of the HMD 21 worn by the user, for example. In such a case, the first output control unit 202 displays on the HMD 21 the writing on the tablet 22-2 associated with the recognized code. On the other hand, the first output control unit 202 does not display on the HMD 21 the writing on the tablet 22-1 associated with the recognized code.

Therefore, since the writing on the tablet 22 associated with the newly recognized code is displayed and the writing on the other tablets 22 is not displayed, the user can easily see the writing.

Next, another display example when there are a plurality of tablets 22 will be described. For example, the tablet 22 to be displayed may be determined for each time zone. For example, the code DB 2001 may store the identification information of the HMD 21, the code for each time zone, and the identification information of the tablet 22 in association with each other for each identification information of the HMD 21. For example, the specifying unit 201 may check whether the recognized code is a code associated with the identification information of the HMD 21 and the time zone. When the recognized code matches a code associated with the identification information of the HMD 21 and the time zone, the first output control unit 202 displays on the HMD 21 the shape representing the writing on the tablet 22 and the input region of the tablet 22 associated with the code. When the recognized code does not match the code associated with the identification information of the HMD 21 and the time zone, the first output control unit 202 does not displays on the HMD 21 the shape representing the writing on the tablet 22 and the input region of the tablet 22 associated with the code. In this manner, the users can be divided according to the time zone.

As an example using FIG. 13, for example, it is assumed that the code displayed on the tablet 22-1 is associated with the identification information of the HMD 21 and the first time zone and the code displayed on the tablet 22-1 is associated with the identification information of the HMD 21 and the second time zone.

The specifying unit 201 recognizes the code displayed on the tablet 22-1 using the imaging device of the HMD 21. In the case of the first time zone, the specifying unit 201 checks whether the code displayed on the tablet 22-1 is associated with the identification information of the HMD 21 and the first time zone. Since the code displayed on the tablet 22-1 is associated with the identification information of the HMD 21 and the first time zone, the writing on the tablet 22-1 and the shape associated with the recognized code are displayed on the HMD 21.

On the other hand, the specifying unit 201 recognizes the code displayed on the tablet 22-2 using the imaging device of the HMD 21. Then, in the case of the first time zone, the specifying unit 201 checks whether the code displayed on the tablet 22-2 is associated with the identification information of the HMD 21 and the first time zone. Since the code displayed on the tablet 22-2 is not associated with the identification information of the HMD 21 and the first time zone, the writing on the tablet 22-2 and the shape associated with the recognized code are not displayed on the HMD 21.

In the case of the second time zone, the specifying unit 201 checks whether the code displayed on the tablet 22-1 is associated with the identification information of the HMD 21 and the second time zone.

Since the code displayed on the tablet 22-1 is not associated with the identification information of the HMD 21 and the second time zone, the writing on the tablet 22-1 and the shape associated with the recognized code are not displayed on the HMD 21. On the other hand, in the case of the second time zone, the specifying unit 201 checks whether the code displayed on the tablet 22-2 is associated with the identification information of the HMD 21 and the second time zone. Since the code displayed on the tablet 22-2 is associated with the identification information of the HMD 21 and the second time zone, the writing on the tablet 22-2 and the shape associated with the recognized code are displayed on the HMD 21.

Alternatively, as another display example when there are a plurality of tablets 22, the first output control unit 202 displays the shape representing the input region of the tablet 22 and the writing on the tablet 22 for each of the predetermined number of tablets 22 among the plurality of tablets 22. In this display example, for example, the first output control unit 202 selects a designated number of tablets 22 from the plurality of tablets 22. The selection method may be in the order of recognition or may be determined for each time zone, but is not particularly limited. For example, selecting a predetermined number of tablets 22 in the order of recognition may mean a predetermined number of tablets 22 that are newly recognized in the order of recognition, or a predetermined number of tablets 22 that are previously recognized in the order of recognition. Then, the first output control unit 202 displays the shape representing the input region of the tablet 22 and the writing on the tablet 22 for each of the predetermined number of selected tablets 22.

Figure 14:
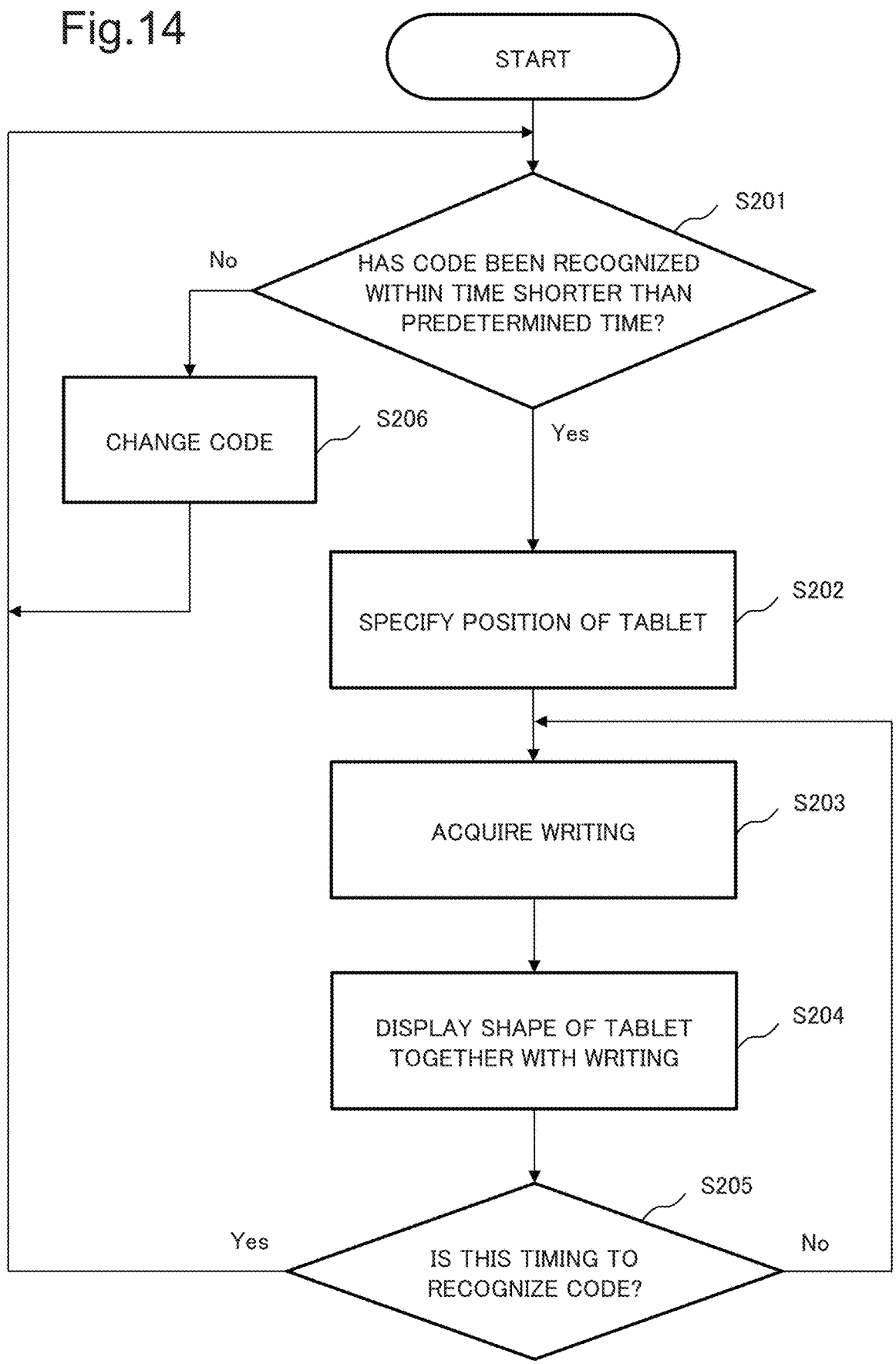
FIG. 14 is a flowchart illustrating an operation example of the output control system according to the second example embodiment.

FIG. 14 is a flowchart illustrating an operation example of the output control system 20 according to the second example embodiment. Here, an example of recognizing the code displayed on the tablet 22 at the start of use and then recognizing the code again at a predetermined timing will be described as an operation example. As an operation example, a case where the tablet 22 is a liquid crystal tablet and the code is changed when the code cannot be recognized for a predetermined time or more will be described as an example.

The specifying unit 201 determines whether the code can be recognized within a time shorter than the predetermined time (step S201).

Then, when the code is recognized within a time shorter than the predetermined time (step S201: Yes), the specifying unit 201 specifies the position of the tablet 22 based on the recognized code (step S202). In step S202, the specifying unit 201 may specify at least one of the distance from the HMD 21 to the tablet 22 and the inclination of the tablet 22. In step S201, the specifying unit 201 specifies the shape representing the input region of the tablet 22.

The writing acquisition unit 203 acquires writing on the tablet 22 associated with the recognized code (step S203). Then, the first output control unit 202 displays the shape representing the input region of the tablet 22 together with the acquired writing (step S204).

Then, the specifying unit 201 determines whether this is a timing to recognize the code (step S205). When this is not the timing to recognize the code (step S205: No), the process returns to step S203. Therefore, when new writing is acquired, the new writing is displayed on the HMD 21.

On the other hand, when this is the timing to recognize the code (step S205: Yes), the process returns to step S201. Therefore, the specifying unit 201 recognizes the code again.

When the code is not recognized for a predetermined time or more (step S201: No), the second output control unit 204 changes the code (step S206) and returns to step S201. For example, when the code is not recognized for the predetermined time or more, the second output control unit 204 may display the code as illustrated in FIG. 5 from the code as illustrated in FIG. 6 or 7.

In this manner, these processes are appropriately repeated as necessary.

As described above, in the second example embodiment, the code displayed on the tablet 22 may be a two-dimensional code. Therefore, various kinds of information can be included in the code.

The output control system 20 specifies the inclination of the tablet 22 and displays on the HMD 21 the input shape of the specified inclination.

The output control system 20 specifies the distance from the imaging device to the tablet 22, and displays the input shape corresponding to the specified distance in the virtual space. For example, the output control system 20 displays the input shape in the virtual space such that the shorter the specified distance in the virtual space, the shorter the distance from the user to the input shape. For example, the output control system 20 displays the input shape in the virtual space such that the longer the specified distance in the virtual space, the longer the distance from the user to the input shape. For example, when the user is moving in the real space, the distance from the user to the input shape in the virtual space changes according to the specified distance, so that the user can feel as if the user is moving in the virtual space.

A plurality of codes may be displayed at different positions on the tablet 22. As a result, the accuracy of specifying the position can be improved. It is possible to improve the accuracy of specifying the distance and the accuracy of specifying the inclination.

When the tablet is a liquid crystal tablet, the output control system changes at least one of the number of codes displayed on the tablet 22, the size of the code, and the display position of the code.

When the code is not recognized for a predetermined time or more, the output control system 20 changes the code displayed on the tablet 22 so as to reduce the number of codes and increase the size of the code.

The output control system 20 changes at least one of the number of codes displayed on the liquid crystal tablet and the size of the code according to the distance from the imaging device to the tablet 22.

The output control system 20 specifies the position of the electronic pen 23 that can operate the tablet 22, and further displays a shape representing the specified electronic pen 23 or a mark indicating the contact point of the electronic pen 23 in the virtual space. As a result, the movement of the electronic pen 23 is visualized in the virtual space.

The contact point of the electronic pen 23 is a point of contact with the tablet 22. As a method of specifying the position of the electronic pen 23, the output control system 20 specifies the position of the electronic pen 23 by infrared communication using the tablet 22. As another method of specifying the position of the electronic pen 23, the output control system 20 specifies the position of the electronic pen 23 by image recognition using the imaging device.

The output control system 20 displays the tablet 22 and the writing on the tablet 22 at a position in the virtual space corresponding to the position of the tablet 22. Therefore, the user can take a note while recognizing the tablet 22 in the real space in the virtual space.

The output control system 20 displays the input shape in a predetermined size in the virtual space based on the aspect ratio of the input region. As a result, it is possible to display the tablet 22 in a size suitable for the user in the virtual space while maintaining the aspect ratio. Therefore, the user can take a note while recognizing the tablet 22 in the real space in the virtual space.

The output control system 20 displays a picture relevant to a use scene of the virtual space. The shape of this picture is the input shape of the tablet 22. It is possible to reproduce a use scene in the real space when the user takes a note.

This is the end of the description of the second example embodiment. The second example embodiment may be modified and used. Modification examples will be described below.

First Modification Example

In the second example embodiment, an example of the method for specifying the position of the tablet 22 using the code has been described. In the first modification example, at least one of a method example of specifying the position of the tablet 22 using infrared rays or ultrasonic waves and a method of specifying the position of the tablet 22 by image recognition using an imaging device, and a method example of specifying the position of the tablet 22 using a code may be used in combination. Therefore, since the position of the tablet 22 is specified by combining a plurality of specifying methods, it is possible to further improve accuracy.

Alternatively, the plurality of specifying methods may be repeated.

When infrared rays or ultrasonic waves are used, for example, the HMD 21 includes a device that emits infrared rays or ultrasonic waves, and the tablet 22 includes a sensor such as an infrared sensor or an ultrasonic sensor. Then, the specifying unit 201 may specify the position of the tablet 22 according to the reception situation of the infrared ray or the ultrasonic wave emitted from the HMD 21 on the tablet 22. The same applies to a case where the specifying unit 201 tracks the electronic pen 23 using infrared rays or ultrasonic waves.

When image recognition using the imaging device is used, the specifying unit 201 captures the tablet 22 with the imaging device of the HMD 21. Then, the specifying unit 201 can specify the position of the tablet 22 by detecting the four corners or three points of the captured tablet 22. Alternatively, the specifying unit 201 can specify the position of the tablet 22 by detecting the frame of the captured input region of the tablet 22. The frame is a line. In the case of the electronic pen 23, for example, the specifying unit 201 may track a part or entirety of the electronic pen 23, such as a contact point of the electronic pen 23 or the other end of the electronic pen 23, by image recognition.

This is the end of the description of each example embodiment and each modification example. The example embodiments and the modification examples described in the example embodiments may be used in combination. For example, in each example embodiment, the output control system may include each functional unit and a part of information.

As described above, the example embodiments and the modification examples are not limited to the examples described above, and various modifications can be made. The configuration of the output control system 20 in each example embodiment is not particularly limited. The output control system 20 may be implemented by one device such as one terminal device and one server. Alternatively, the output control system 20 may be implemented by devices different for each function or data. The output control system 20 may include a plurality of servers.

The transmission/reception target between the output control system 20 and other devices described in each example embodiment and modification example may be information itself or may be an identifier representing information, and is not particularly limited.

In each example embodiment and modification example, each table or information may include a part of the information described above. Each table or information may include information other than the above-described information. More specifically, each table or information may be divided into a plurality of tables or a plurality of pieces of information. As described above, a method for implementing each table or information is not particularly limited.

Each screen displayed on the tablet 22 and each screen displayed on the HMD 21 are examples, and are not particularly limited. In each screen, a button, a list, a check box, an information display field, an input field, and the like (not illustrated) may be added. The background color of the screen and the like may be changed.

For example, in each example embodiment, the processing for generating information or the like of the screen to be displayed on the tablet 22 may be performed by the second output control unit 204 of the output control system 20 or may be performed by the tablet 22.

For example, in each example embodiment, the processing for generating information or the like of the screen to be displayed on the HMD 21 may be performed by the first output control unit 202 of the output control system 20 or may be performed by the HMD 21.

Specifically, for example, the first output control unit 202 may transmit writing and an input shape and information regarding display, such as their display positions, to the HMD 21, and the HMD 21 may generate screen information based on the information and display the screen. Alternatively, the first output control unit 202 may generate information of a screen to be displayed on the HMD 21 and transmit the information of the screen to the HMD 21, and the HMD 21 may display the screen based on the received information of the screen.

(Hardware Configuration Example of Computer)

Figure 15:
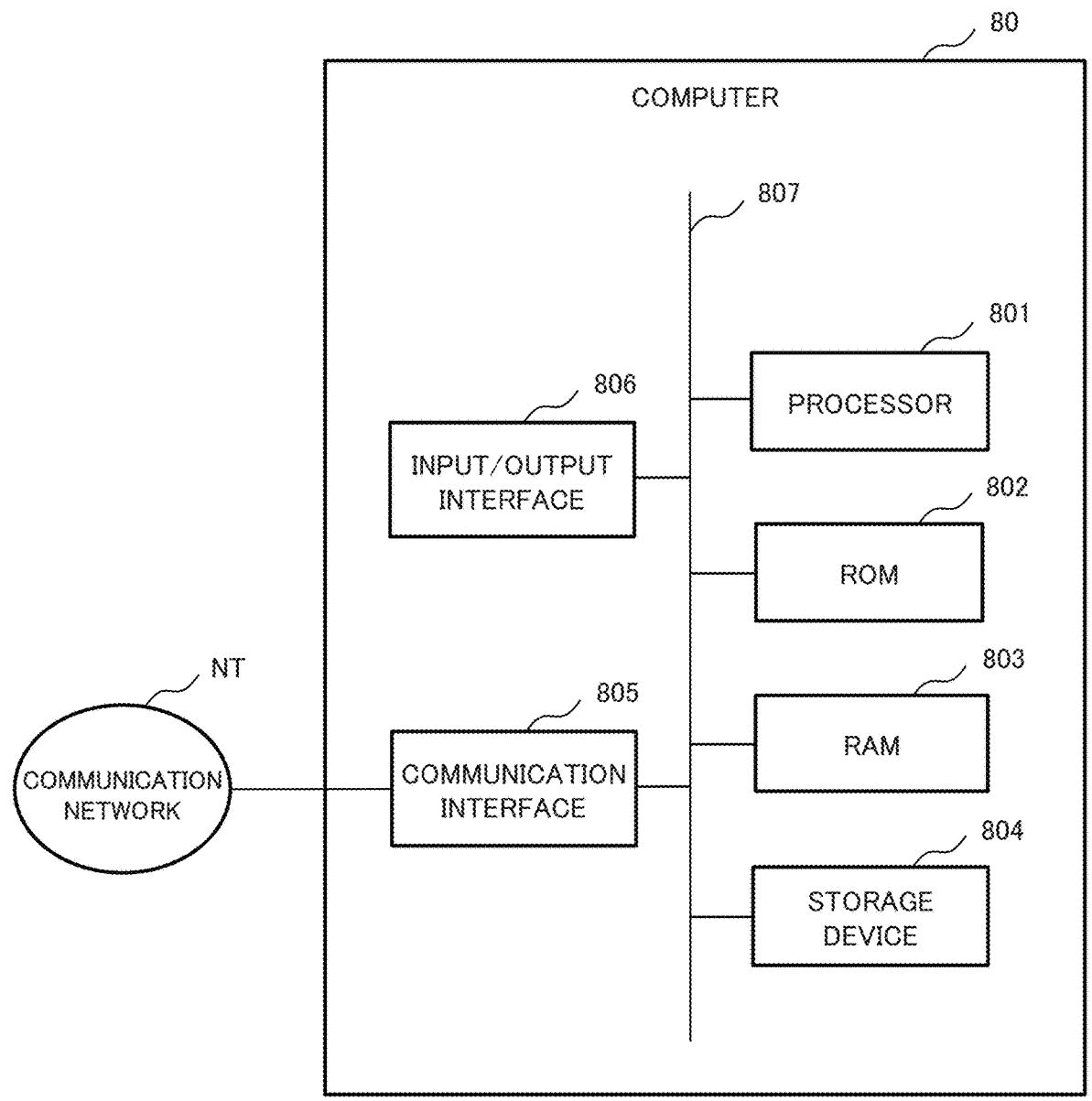
FIG. 15 is an explanatory diagram illustrating a hardware configuration example of a computer.

Next, a hardware configuration example when each device, such as the output control system 20, the HMD 21, and the tablet 22 described in each example embodiment, is implemented by a computer will be described. FIG. 15 is an explanatory diagram illustrating a hardware configuration example of a computer. For example, a part or entirety of each device can be implemented by using any combination of a computer 80 and a program illustrated in FIG. 15, for example.

The computer 80 includes, for example, a processor 801, a read only memory (ROM) 802, a random access memory (RAM) 803, and a storage device 804. The computer 80 includes a communication interface 805 and an input/output interface 806. The components are connected to each other through, for example, a bus 807. The number of components is not particularly limited, and is one or more.

The processor 801 controls the entire computer 80. Examples of the processor 801 include a central processing unit (CPU), a digital signal processor (DSP), and a graphics processing unit (GPU). The computer 80 includes the ROM 802, the RAM 803, the storage device 804, and the like as storage units. Examples of the storage device 804 include a semiconductor memory such as a flash memory, a hard disk drive (HDD), and a solid state drive (SSD). For example, the storage device 804 stores an operating system (OS) program, an application program, a program according to each example embodiment, and the like.

Alternatively, the ROM 802 stores an application program, a program according to each example embodiment, and the like. Then, the RAM 803 is used as a work area of the processor 801.

The processor 801 loads a program stored in the storage device 804, the ROM 802, or the like. Then, the processor 801 executes each process coded in the program. The processor 801 may download various programs through the communication network NT. The processor 801 functions as a part or entirety of the computer 80. Then, the processor 801 may execute processing or instructions in the illustrated flowchart based on the program.

The communication interface 805 is connected to the communication network NT, such as a local area network (LAN) or a wide area network (WAN), through a wireless or wired communication line. The communication network NT may include a plurality of communication networks NT. As a result, the computer 80 is connected to an external device or an external computer 80 through the communication network NT. The communication interface 805 serves as an interface between the communication network NT and the inside of the computer 80. Then, the communication interface 805 controls input and output of data from an external device or the external computer 80.

The input/output interface 806 is connected to at least one of an input device, an output device, and an input/output device. The connection method may be wireless or wired. Examples of the input device include a keyboard, a mouse, and a microphone. Examples of the output device include a display device, a lighting device, and a speaker that outputs sound. Examples of the input/output device include a touch panel display. The input device, the output device, the input/output device, and the like may be built in the computer 80 or may be externally attached.

The hardware configuration of the computer 80 is an example. The computer 80 may have some components shown in FIG. 15. The computer 80 may have components other than those illustrated in FIG. 15. For example, the computer 80 may include a drive device or the like. Then, the processor 801 may read a program or data stored in a recording medium attached to a drive device or the like into the RAM 803. Examples of the non-transitory tangible recording medium include an optical disk, a flexible disk, a magnetic optical disk, and a universal serial bus (USB) memory. As described above, for example, the computer 80 may include an input device such as a keyboard or a mouse. The computer 80 may have an output device such as a display. The computer 80 may include an input device, an output device, and an input/output device.

The computer 80 may include various sensors (not illustrated). The type of the sensor is not particularly limited. Examples of the sensor include an acceleration sensor, a gyro sensor, a magnetic sensor, a global positioning system (GPS) sensor. Examples of the sensor include a fingerprint sensor, LiDAR (Light, Detection and Ranging), a proximity sensor, and an ambient light sensor.

This is the end of the description of the hardware configuration of each device. There are various modification examples in a method for implementing each device. For example, the output control system 20 may be implemented by any combination of a computer and a program different for each component. A plurality of components included in each device may be implemented by any combination of one computer and a program.

Some or all of components of each device may be implemented by an application specific circuit. Some or all of components of each device may be implemented by a general-purpose circuit including a processor such as a field programmable gate array (FPGA). Some or all of components of each device may be implemented by a combination of an application specific circuit, a general-purpose circuit, and the like. These circuits may be a single integrated circuit. Alternatively, these circuits may be divided into a plurality of integrated circuits. The plurality of integrated circuits may be configured by being connected to each other through a bus or the like.

When some or all of components of each device is implemented by a plurality of computers, circuits, and the like, the plurality of computers, circuits, and the like may be arranged in a centralized manner or in a distributed manner.

The output control method described in each example embodiment is implemented by being executed by the output control system 20. For example, the output control method is implemented by a computer such as a server or a terminal device executing a program prepared in advance. The program described in each example embodiment is recorded in a computer-readable recording medium such as an HDD, an SSD, a flexible disk, an optical disk, a flexible disk, a magnetic optical disk, or a USB memory. Then, the program is executed by being read from the recording medium by the computer. The program may be distributed through the communication network NT.

The function of each component of the output control system 20 in each example embodiment described above may be implemented by hardware, such as a computer. Alternatively, each component may be implemented by a computer or firmware based on program control.

While the present disclosure has been described with reference to the example embodiments, the present disclosure is not limited to the example embodiments described above. The configuration and details of the present disclosure may include example embodiments to which various changes that can be grasped by those skilled in the art within the scope of the present disclosure are applied. The present disclosure may include example embodiments in which the matters described in this specification are appropriately combined or replaced as necessary. For example, the matters described using a specific example embodiment can be applied to other example embodiments as long as no contradiction occurs. For example, although the plurality of operations are described in order in the form of a flowchart, the order of description does not limit the order of executing the plurality of operations. Therefore, when each example embodiment is implemented, the order of the plurality of operations can be changed within a range that does not interfere with the content.

Some or all of the above example embodiments can also be described as the following Supplementary Notes. However, some or all of the above example embodiments are not limited to the following.

(Supplementary Note 1)

An output control system, including:
- a specifying means for specifying a position of a tablet by recognizing a code displayed on the tablet in a real space using an imaging device; and
- a first output control means for displaying a shape representing an input region of the tablet whose the position has been specified in a virtual space in a head mounted display.

(Supplementary Note 2)

The output control system according to Supplementary Note 1, in which
- the first output control means displays writing on the tablet within the shape representing the input region of the tablet.

(Supplementary Note 3)

The output control system according to Supplementary Note 1 or 2, in which
- the head mounted display includes the imaging device.

(Supplementary Note 4)

The output control system according to any one of Supplementary Notes 1 to 3, in which
- the code is a two-dimensional code.

(Supplementary Note 5)

The output control system according to any one of Supplementary Notes 1 to 4, in which
- the specifying means specifies an inclination of the tablet, and
- the first output control means displays the shape of the specified inclination.

(Supplementary Note 6)

The output control system according to any one of Supplementary Notes 1 to 5, in which
- the specifying means specifies a distance from the imaging device to the tablet, and the first output control means displays the shape corresponding to the specified distance in the virtual space.

(Supplementary Note 7)

The output control system according to any one of Supplementary Notes 1 to 6, in which the code is a plurality of codes displayed at different positions on the tablet.

(Supplementary Note 8)

The output control system according to any one of Supplementary Notes 1 to 7, in which the tablet is a liquid crystal tablet, and a second output control means for changing at least one of the number of codes displayed on the liquid crystal tablet, a size of the code, and a display position of the code is provided.

(Supplementary Note 9)

The output control system according to Supplementary Note 8, in which the second output control means changes the code displayed on the liquid crystal tablet in such a way as to reduce the number of codes and increase the size of the code when the code is not recognized for a predetermined time or more by the specifying means.

(Supplementary Note 10)

The output control system according to Supplementary Note 8 or 9, in which the specifying means specifies a distance from the imaging device to the tablet, and the second output control means changes at least one of the number of codes displayed on the liquid crystal tablet and the size of the code according to the distance.

(Supplementary Note 11)

The output control system according to any one of Supplementary Notes 1 to 10, in which the specifying means specifies a position of a pointing device capable of operating the tablet, and the first output control means further displays a mark indicating the specified pointing device or a contact point of the pointing device in the virtual space.

(Supplementary Note 12)

The output control system according to Supplementary Note 11, in which the specifying means specifies the position of the pointing device by infrared communication using the head mounted display.

(Supplementary Note 13)

The output control system according to Supplementary Note 12, in which the specifying means specifies the position of the pointing device by image recognition using the imaging device.

(Supplementary Note 14)

The output control system according to any one of Supplementary Notes 1 to 13, in which the first output control means displays the shape and the writing on the tablet at a position in the virtual space corresponding to a position of the tablet in the real space.

(Supplementary Note 15)

The output control system according to any one of Supplementary Notes 1 to 14, in which the first output control means displays the input region in a predetermined size in the virtual space based on an aspect ratio of the input region.

(Supplementary Note 16)

The output control system according to any one of Supplementary Notes 1 to 15, in which the first output control means displays a picture relevant to a use scene of the virtual space, and a shape of the picture is the shape representing the input region of the tablet.

(Supplementary Note 17)

An output control method, including:

specifying a position of a tablet by recognizing a code displayed on the tablet in a real space using an imaging device; and displaying a shape representing an input region of the tablet whose the position has been specified in a virtual space in a head mounted display.

(Supplementary Note 18)

A non-transitory computer-readable recording medium recording a program causing a computer to execute processing for:

specifying a position of a tablet by recognizing a code displayed on the tablet in a real space using an imaging device; and displaying a shape representing an input region of the tablet whose the position has been specified in a virtual space in a head mounted display.

(Supplementary Note 19)

A program causing a computer to execute processing for:

specifying a position of a tablet by recognizing a code displayed on the tablet in a real space using an imaging device; and displaying a shape representing an input region of the tablet whose the position has been specified in a virtual space in a head mounted display.

REFERENCE SIGNS LIST 10, 20 output control system
21 HMD
22, 22-1, 22-2 tablet
23, 23-1, 23-2 electronic pen
101, 201 specifying unit
102, 202 first output control unit
203 writing acquisition unit
204 second output control unit
205 identification unit
206 identification information acquisition unit
2001 code DB
80 computer
801 processor
802 ROM
803 RAM
804 storage device
805 communication interface
806 input/output interface
807 bus
NT communication network

What is claimed is:

1. An output control system, comprising:

at least one memory storing instructions; and at least one processor configured to execute the instructions to:

specify a position of a tablet by recognizing a code displayed on the tablet in a real space using an imaging device;

display a shape representing an input region of the tablet whose the position has been specified in a virtual space in a head mounted display; and decrease a size of the code displayed on the tablet based on the code not being recognized for a predetermined period of time.

2. The output control system according to claim 1, wherein the at least one processor is further configured to execute the instructions to:
  display writing on the tablet within the shape representing the input region of the tablet.

3. The output control system according to claim 1, wherein
  the head mounted display includes the imaging device.

4. The output control system according to claim 1, wherein
  the code is a two-dimensional code.

5. The output control system according to claim 1, wherein the at least one processor is further configured to execute the instructions to:
  specify an inclination of the tablet; and
  display the shape of the specified inclination.

6. The output control system according to claim 1, wherein the at least one processor is further configured to execute the instructions to:
  specify a distance from the imaging device to the tablet; and
  display the shape corresponding to the specified distance in the virtual space.

7. The output control system according to claim 1, wherein
  the code is a plurality of codes displayed at different positions on the tablet.

8. The output control system according to claim 1, wherein
  the tablet is a liquid crystal tablet,
  wherein the at least one processor is further configured to execute the instructions to:
  change at least one of the number of codes displayed on the liquid crystal tablet and a display position of the code is provided.

9. The output control system according to claim 8, wherein the at least one processor is further configured to execute the instructions to:
  specify a distance from the imaging device to the tablet; and
  change at least one of the number of codes displayed on the liquid crystal tablet and the size of the code displayed on the liquid crystal according to the distance.

10. The output control system according to claim 1, wherein the at least one processor is further configured to execute the instructions to:
  specify a position of a pointing device capable of operating the tablet; and
  display a mark indicating the specified pointing device or a contact point of the pointing device in the virtual space.

11. The output control system according to claim 10, wherein the at least one processor is further configured to execute the instructions to:
  specify the position of the pointing device by infrared communication using the head mounted display.

12. The output control system according to claim 11, wherein the at least one processor is further configured to execute the instructions to:
  specify the position of the pointing device by image recognition using the imaging device.

13. The output control system according to claim 1, wherein the at least one processor is further configured to execute the instructions to:
  display the shape and the writing on the tablet at a position in the virtual space corresponding to a position of the tablet in the real space.

14. The output control system according to claim 1, wherein the at least one processor is further configured to execute the instructions to:
  display the input region in a predetermined size in the virtual space based on an aspect ratio of the input region.

15. The output control system according to claim 1, wherein the at least one processor is further configured to execute the instructions to:
  display a picture relevant to a use scene of the virtual space, wherein
  a shape of the picture is the shape representing the input region of the tablet.

16. The output control system according to claim 1, wherein the at least one processor is further configured to execute the instructions to:
  acquire identification information of a head mounted display including an imaging device worn by a user;
  compare predetermined identification information of the head mounted display associated with the recognized code stored in a code database with the acquired identification information of the head mounted display worn by the user, wherein the code database stores a code, identification information of a tablet, and identification information of a head mounted display in association with each other; and
  display the shape representing the input region of the tablet whose position has been specified in the virtual space in the head mounted display of the user based on the predetermined identification information of the head mounted display associated with the recognized code matching the acquired identification information of the head mounted display worn by the user.

17. An output control method, comprising:
  specifying a position of a tablet by recognizing a code displayed on the tablet in a real space using an imaging device;
  displaying a shape representing an input region of the tablet whose the position has been specified in a virtual space in a head mounted display; and
  decreasing a size of the code displayed on the tablet based on the code not being recognized for a predetermined period of time.

18. A non-transitory computer-readable recording medium recording a program causing a computer to execute processing for:
  specifying a position of a tablet by recognizing a code displayed on the tablet in a real space using an imaging device;
  displaying a shape representing an input region of the tablet whose the position has been specified in a virtual space in a head mounted display; and
  decreasing a size of the code displayed on the tablet based on the code not being recognized for a predetermined period of time.

* * * * *